(12) United States Patent
Jiang

(10) Patent No.: US 7,688,748 B2
(45) Date of Patent: Mar. 30, 2010

(54) METHODS AND APPARATUS FOR RANKING A NODE IN A NETWORK HAVING A PLURALITY OF INTERCONNECTING NODES

(75) Inventor: Bin Jiang, Hong Kong, SAR (HK)

(73) Assignee: The Hong Kong Polytechnic University, Hong Kong Sar (HK)

( * ) Notice: Subject to any disclaimer, the term of this patent is extended or adjusted under 35 U.S.C. 154(b) by 671 days.

(21) Appl. No.: 11/525,101

(22) Filed: Sep. 22, 2006

(65) Prior Publication Data

US 2008/0075014 A1 Mar. 27, 2008

(51) Int. Cl.
*H04L 12/26* (2006.01)
(52) U.S. Cl. .................. 370/252; 370/238; 370/254
(58) Field of Classification Search ........... 370/241, 370/252, 229, 235, 238, 254; 700/90, 245, 700/262; 709/238, 240
See application file for complete search history.

(56) References Cited

U.S. PATENT DOCUMENTS

| | | | | |
|---|---|---|---|---|
| 5,495,479 A | * | 2/1996 | Galaand et al. | 370/404 |
| 6,509,898 B2 | * | 1/2003 | Chi et al. | 345/440 |
| 6,799,176 B1 | * | 9/2004 | Page | 707/5 |
| 2004/0151130 A1 | * | 8/2004 | Beshai et al. | 370/254 |
| 2008/0270390 A1 | * | 10/2008 | Ward et al. | 707/5 |

* cited by examiner

*Primary Examiner*—Chi H Pham
*Assistant Examiner*—Weibin Huang
(74) *Attorney, Agent, or Firm*—Buchanan Ingersoll & Rooney PC

(57) ABSTRACT

PageRank (PR) is used by web search engine Google in ranking individual web pages. However, it is known that this value is also easily manipulated by methods known as spoofing. Further, the calculation of PR will require iterative cycles of computations to achieve a "steady" value. This would mean that huge computation resources are required to obtain reasonably reliable PR values for various web pages. This invention provides relatively accurate and simple methods for ranking the importance of a node in a network. The web graph or the network is first represented by an incidence matrix or a representation matrix W. The matrix W is then self-multiplied to obtain flow matrix. The flow capacity, or the rank of each node, is then obtained from the flow matrix.

12 Claims, 2 Drawing Sheets

(a)　　　　　　(b)　　　　　　(c)

METHODS AND APPARATUS FOR RANKING A NODE IN A NETWORK HAVING A PLURALITY OF INTERCONNECTING NODES

FIELD OF THE INVENTION

This invention relates to method of ranking a node in network, particularly for ranking a web page in the internet.

BACKGROUND OF THE INVENTION

PageRank (PR) is used by the web search engine Google in ranking individual web pages. This method is described in U.S. Pat. No. 6,799,176. To calculate PR for a web page, all of its inbound links are taken into account, including links from within the site and links from outside the site. When calculating PR, pages with no outbound links are assumed to have linked out to all other pages in the collection. Their PR scores are therefore divided evenly among all other pages. PR of a web page A is calculated by the equation:

$$PR(p_i) = \frac{(1-d)}{N} + d\left(\frac{PR(t_1)}{C(t_1)} + \frac{PR(t_2)}{C(t_2)} + \ldots + \frac{PR(t_n)}{C(t_n)}\right)$$

where $t_1$ to $t_n$ are pages linked to page A, C is the number of outbound links of a particular page, and d is a damping factor, usually being set to 0.85 to reduce influence of pages acting ask "sinks".

While the PR is considered to be accurate at the time of publication by Google for most sites, it is known that this value is also easily manipulated. For example, any low page with a low PR value that is redirected, for instance to a "Refresh" meta tag, to a high PR page causes the lower PR page to acquire the PR of the destination page. In theory a new PR 0 page with no incoming links can be redirected to the Google home page, which is a PR 10 page. By the next update the PR of the new page will be upgraded to 10. This is known as spoofing and is a known failing or bug in the calculation of PR. Any page's PR can be manipulated or "spoofed" to a higher or lower value.

Further, the calculation of PR will require iterative cycles of computations to achieve a "steady" value. This would mean that huge computation resources are required to obtain reasonably reliable PR values for various web pages.

OBJECTS OF THE INVENTION

Therefore, it is an object of this invention to provide a method of determining the importance of a webpage or node in network that is more difficult to be influenced by redirection, or requiring less computation resources. It is also an objection of this invention to resolve at least one or more of the problems as set forth in the prior art. As a minimum, it is an object of this invention to provide the public with a useful choice.

SUMMARY OF THE INVENTION

Accordingly, this invention provides a method of ranking a node within a network of a plurality of interconnected nodes, each node having a connection with at least one other node in the network, the method including the steps of:

constructing a representation matrix, wherein each element of the representation matrix represents the connection between each of the interconnected nodes;

obtaining a flow matrix by multiplying the representation matrix by itself, wherein each element of the flow matrix represents a flow dimension of the respective node;

calculating flow capacity of each node based on the flow dimension, wherein the flow capacity of each node represents the number of connections to a particular node versus the distance or number of node interconnections required to access said particular node from all other nodes of the network; and ranking each node according to its respective flow capacity.

each element of the representation matrix uses the number "1" to represent the presence of a connection between each of the interconnecting nodes and the number "0" to represent the absence of a connection between each of the interconnecting nodes.

Preferably the flow capacity of each node is calculated by equation 1:

$$FC(v_i) = \frac{1}{(n-1)} \sum_{k=1}^{l} \sum_{j=1}^{n} \frac{k}{d_k(i,j)} \qquad (1)$$

wherein n is the total number of nodes in the network;

i and j denotes particular node i and node j in the network;

l is the highest number in the flow matrix;

$d_k(i,j)$ is the shortest distance from node i to node j in a flow graph representing the flow matrix; and k is the dimension from 1 to l.

The representation matrix is preferably provided in upper triangular form. Preferably all of the elements in the lower diagonal portion of the flow matrix are set to zero such that the flow matrix is in upper diagonal form.

In an embodiment, the network is the internet, and each node is a web page.

In another aspect, the present invention provides an apparatus for ranking a node within a network of a plurality of interconnected nodes, each node having a connection to at least one of other nodes in the network, the apparatus including a processor and an algorithm operating according to the steps of:

constructing a representation matrix, wherein each element of the representation matrix represents the connection between each of the interconnected nodes;

obtaining a flow matrix by multiplying the representation matrix by itself, wherein each element of the flow matrix represents a flow dimension of the respective node;

calculating flow capacity of each node based on the flow dimension, wherein the flow capacity of each node represents the number of connections to a particular node versus distances or number of node interconnections required to access said particular node from all other nodes; and ranking each node according to its respective flow capacity.

Preferably each element of the representation matrix uses the number "1" to represent the presence of a connection between each of the interconnecting nodes and the number "0" to represent the absence of a connection between each of the interconnecting nodes.

The flow capacity of each node is preferably calculated by equation 1:

$$FC(v_i) = \frac{1}{(n-1)} \sum_{k=1}^{l} \sum_{j=1}^{n} \frac{k}{d_k(i, j)} \quad (1)$$

wherein n is the total number of nodes in the network;

i and j denotes particular node i and node j in the network;

l is the highest number in the flow matrix;

$d_k(i,j)$ is the shortest distance from node i to node j in a flow graph representing the flow matrix; and k is the dimension from 1 to l.

The representation matrix is provided in upper triangular form. Preferably all of the elements in the lower diagonal portion of the flow matrix are set to zero such that the flow matrix is in upper diagonal form.

In another embodiment, the network is the internet, and each node is a web page.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENTS

This invention is now described by way of example with reference to the figures in the following paragraphs.

Objects, features, and aspects of the present invention are disclosed in or are apparent from the following description. It is to be understood by one of ordinary skilled in the art that the present discussion is a description of exemplary embodiments only, and is not intended as limiting the broader aspects of the present invention, which broader aspects are embodied in the exemplary constructions.

It would be easier to understand this invention by describing an example. It should be noted that although the following description describes ranking web pages, this method is also applicable in ranking any interconnecting nodes in a network. For example, this method can be used to evaluate the importance of junctions in a traffic network. Further, it would be apparent to a person skilled in the art that the method of this invention can be used in a network with indefinite number of interconnecting nodes.

Figure 1:
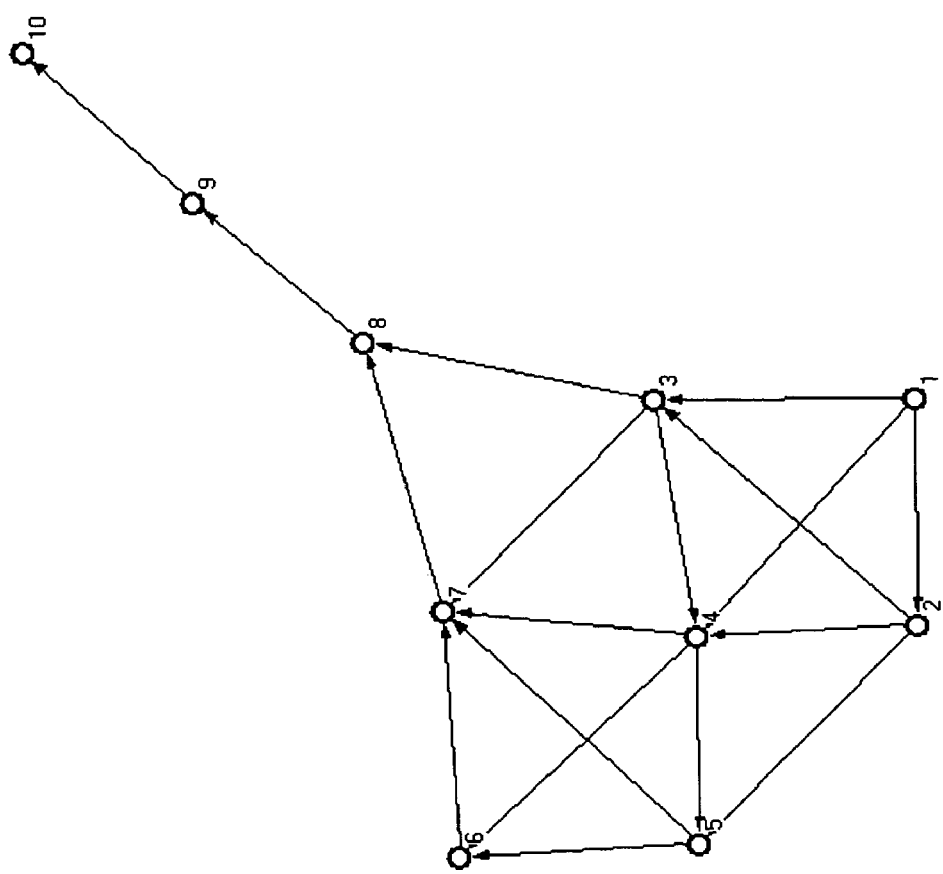
FIG. 1 shows an example of a notional web graph.
Figure 2:
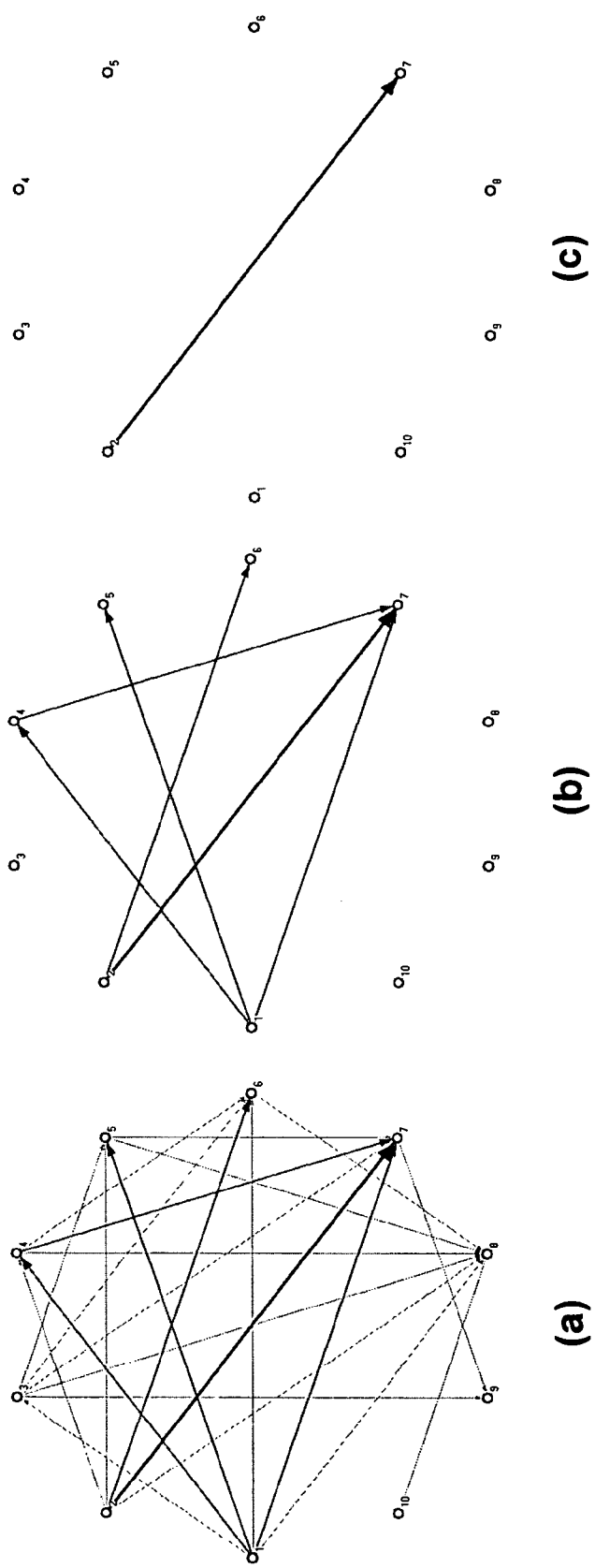
FIG. 2 shows the flow diagrams derived from the web graph of FIG. 1, which indicates the importance of each node in different dimensions.

FIG. 1 shows a notional web graph, which represents a website structure having 10 web pages. The interconnections between each page are represented by the arrows between each node. For example, the node 8 has connections with nodes 3, 7, and 9.

The first step of the method of this invention is to represent the web graph an incidence matrix or a representation matrix W as follows:

$$W = \begin{matrix} & \begin{matrix} 1 & 2 & 3 & 4 & 5 & 6 & 7 & 8 & 9 & 10 \end{matrix} \\ \begin{matrix} 1 \\ 2 \\ 3 \\ 4 \\ 5 \\ 6 \\ 7 \\ 8 \\ 9 \\ 10 \end{matrix} & \begin{bmatrix} 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 0 & 0 & 1 & 1 & 0 & 0 \\ 0 & 0 & 0 & 0 & 1 & 1 & 1 & 0 & 0 & 0 \\ 0 & 0 & 0 & 0 & 0 & 1 & 1 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \\ 0 & 0 & 0 & 0 & 0 & 0 & 0 & 0 & 0 & 0 \end{bmatrix} \end{matrix}$$

One will note that the lower diagonal elements of the matrix W are all set to zero for the ease of subsequent computations. However, this is merely an option, and a person skilled in the art can choose to fill the representation matrix completely.

An existing connection between the web pages or the node is represented by the number "1". For example, the elements at [3,8] and [7,8] are 1. The element at [8,9] is zero as such belongs to the lower diagonal of the matrix, which is adjusted to be zero as discussed above. The representation of the connection between the web pages or nodes 8 and 9 are preserved in the element at [9,8]. Again, the number representing an existing connection in the matrix can be any number, although integers are preferred. The number "1" is more preferred due to ease of subsequent computations.

However, if desired, "weighted" factors may be introduced into this method by assigning different numbers to the elements in the matrix. For example, a "more important" connection can be represented by the number "2", or even "10". A person skilled in the art would understand that this would not affect the calculation below, and what number to choose to represent the connection is a matter of design choice.

The next step of the method of this invention is to derive a flow matrix by using operation F=W*W, that is, self-multiplying the representation matrix W. The flow matrix F is represented as follows:

$$F = \begin{matrix} & \begin{matrix} 1 & 2 & 3 & 4 & 5 & 6 & 7 & 8 & 9 & 10 \end{matrix} \\ \begin{matrix} 1 \\ 2 \\ 3 \\ 4 \\ 5 \\ 6 \\ 7 \\ 8 \\ 9 \\ 10 \end{matrix} & \begin{bmatrix} 0 & 0 & 1 & 2 & 2 & 1 & 2 & 1 & 0 & 0 \\ 0 & 0 & 0 & 1 & 1 & 2 & 3 & 1 & 0 & 0 \\ 0 & 0 & 0 & 0 & 1 & 1 & 1 & 1 & 1 & 0 \\ 0 & 0 & 0 & 0 & 0 & 1 & 2 & 1 & 0 & 0 \\ 0 & 0 & 0 & 0 & 0 & 0 & 1 & 1 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \\ 0 & 0 & 0 & 0 & 0 & 0 & 0 & 0 & 0 & 0 \\ 0 & 0 & 0 & 0 & 0 & 0 & 0 & 0 & 0 & 0 \end{bmatrix} \end{matrix}$$

Note that all the diagonal elements of the flow matrix F are again set to zeros for the ease of subsequent computations. The non-zero elements in the flow matrix F indicate the number of transit node that channel information flow from one node to another. For example, the element F[2,7] indicates that there are three transit nodes (nodes 3, 4 and 5) that channel information flow from the node 2 to the node 7. The number of transit nodes is termed "flow dimension".

The concept of flow dimension can be described as the number of common friends between a pair of friends in the social setting. The flow matrix F can also be represented by FIGS. 3a to 3c, wherein the line thickness represents the flow dimension between every pair of the nodes. FIG. 3a shows all flow dimensions, while FIG. 3b has removed flow dimensions of one, and FIG. 3c has removed flow dimensions of 1 and 2.

For a vertex $v_i$ of a web graph, it is found that the flow capacity, or the rank of each node, is obtained by equation (1):

$$FC(v_i) = \frac{1}{(n-1)} \sum_{k=1}^{l} \sum_{j=1}^{n} \frac{k}{d_k(i,j)} \quad (1)$$

where l denotes the highest dimensional level of a web graph, that is, the highest number in the flow matrix F. $d_k(i,j)$ represents the shortest distance from the vertex i to j. k is the dimension from 1 to l. It should be appreciated that the term "distance" does not necessarily denote length of path of travel, rather is indicative of the number of interconnections between nodes for a particulars pathway. The results of equation (1) can be calculated empirically or by know mathematics programs once the flow matrix F is know. Below shows how the results of equation (1) is calculated empirically.

At the dimension one (k=1), assuming the flow dimension from every node to every other node is one, i.e., $$K_1 = \begin{array}{c} \\ 1 \\ 2 \\ 3 \\ 4 \\ 5 \\ 6 \\ 7 \\ 8 \\ 9 \\ 10 \end{array} \begin{bmatrix} 1 & 2 & 3 & 4 & 5 & 6 & 7 & 8 & 9 & 10 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \end{bmatrix}$$

The shortest distance from every node to every other node is represented as follows:

$$D_1 = \begin{array}{c} \\ 1 \\ 2 \\ 3 \\ 4 \\ 5 \\ 6 \\ 7 \\ 8 \\ 9 \\ 10 \end{array} \begin{bmatrix} 1 & 2 & 3 & 4 & 5 & 6 & 7 & 8 & 9 & 10 \\ \infty & \infty & 1 & 1 & 1 & 1 & 1 & 1 & 2 & 2 \\ \infty & \infty & \infty & 1 & 1 & 1 & 1 & 1 & 2 & 2 \\ \infty & \infty & \infty & \infty & 1 & 1 & 1 & 1 & 1 & 2 \\ \infty & \infty & \infty & \infty & \infty & 1 & 1 & 1 & 2 & 2 \\ \infty & \infty & \infty & \infty & \infty & \infty & 1 & 1 & 2 & 2 \\ \infty & \infty & \infty & \infty & \infty & \infty & \infty & 1 & \infty & 2 \\ \infty & \infty & \infty & \infty & \infty & \infty & \infty & \infty & 1 & \infty \\ \infty & \infty & \infty & \infty & \infty & \infty & \infty & \infty & \infty & 1 \\ \infty & \infty & \infty & \infty & \infty & \infty & \infty & \infty & \infty & \infty \\ \infty & \infty & \infty & \infty & \infty & \infty & \infty & \infty & \infty & \infty \end{bmatrix}$$

With $K_1$ and $D_1$, the flow capacity at the dimensional one can obtained by the operation of SUM ($K_1/D_1$), i.e. [0, 0, 1, 2, 3, 4, 5, 6, 4, 4].

At the dimension two (k=2), again assuming flow dimension from every node to every other node is two, i.e., $$K_2 = \begin{array}{c} \\ 1 \\ 2 \\ 3 \\ 4 \\ 5 \\ 6 \\ 7 \\ 8 \\ 9 \\ 10 \end{array} \begin{bmatrix} 1 & 2 & 3 & 4 & 5 & 6 & 7 & 8 & 9 & 10 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \\ 2 & 2 & 2 & 2 & 2 & 2 & 2 & 2 & 2 & 2 \end{bmatrix}$$

The shortest distance from every node to every other node is represented as follows:

$$D_2 = \begin{array}{c} \\ 1 \\ 2 \\ 3 \\ 4 \\ 5 \\ 6 \\ 7 \\ 8 \\ 9 \\ 10 \end{array} \begin{bmatrix} 1 & 2 & 3 & 4 & 5 & 6 & 7 & 8 & 9 & 10 \\ \infty & \infty & \infty & 1 & 1 & \infty & 1 & \infty & \infty & \infty \\ \infty & \infty & \infty & \infty & \infty & 1 & 1 & \infty & \infty & \infty \\ \infty & \infty & \infty & \infty & \infty & \infty & \infty & \infty & \infty & \infty \\ \infty & \infty & \infty & \infty & \infty & \infty & 1 & \infty & \infty & \infty \\ \infty & \infty & \infty & \infty & \infty & \infty & \infty & \infty & \infty & \infty \\ \infty & \infty & \infty & \infty & \infty & \infty & \infty & \infty & \infty & \infty \\ \infty & \infty & \infty & \infty & \infty & \infty & \infty & \infty & \infty & \infty \\ \infty & \infty & \infty & \infty & \infty & \infty & \infty & \infty & \infty & \infty \\ \infty & \infty & \infty & \infty & \infty & \infty & \infty & \infty & \infty & \infty \\ \infty & \infty & \infty & \infty & \infty & \infty & \infty & \infty & \infty & \infty \end{bmatrix}$$

The flow capacity at the dimension two can obtained in a similar fashion by the operation of SUM ($K_2/D_2$), i.e. [0, 0, 0, 2, 2, 2, 6, 0, 0, 0]

The flow dimension at the dimension three from every node to every other node is three, i.e., $$K_3 = \begin{array}{c} \\ 1 \\ 2 \\ 3 \\ 4 \\ 5 \\ 6 \\ 7 \\ 8 \\ 9 \\ 10 \end{array} \begin{bmatrix} 1 & 2 & 3 & 4 & 5 & 6 & 7 & 8 & 9 & 10 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \\ 3 & 3 & 3 & 3 & 3 & 3 & 3 & 3 & 3 & 3 \end{bmatrix}$$

The shortest distance from every node to every other node is represented as follows:

$$D_3 = \begin{matrix} & 1 & 2 & 3 & 4 & 5 & 6 & 7 & 8 & 9 & 10 \\ 1 & \infty & \infty & \infty & \infty & \infty & \infty & \infty & \infty & \infty & \infty \\ 2 & \infty & \infty & \infty & \infty & \infty & \infty & 1 & \infty & \infty & \infty \\ 3 & \infty & \infty & \infty & \infty & \infty & \infty & \infty & \infty & \infty & \infty \\ 4 & \infty & \infty & \infty & \infty & \infty & \infty & \infty & \infty & \infty & \infty \\ 5 & \infty & \infty & \infty & \infty & \infty & \infty & \infty & \infty & \infty & \infty \\ 6 & \infty & \infty & \infty & \infty & \infty & \infty & \infty & \infty & \infty & \infty \\ 7 & \infty & \infty & \infty & \infty & \infty & \infty & \infty & \infty & \infty & \infty \\ 8 & \infty & \infty & \infty & \infty & \infty & \infty & \infty & \infty & \infty & \infty \\ 9 & \infty & \infty & \infty & \infty & \infty & \infty & \infty & \infty & \infty & \infty \\ 10 & \infty & \infty & \infty & \infty & \infty & \infty & \infty & \infty & \infty & \infty \end{matrix}$$

The flow capacity at the dimension three can be obtained by the operation of SUM ($K_3/D_3$), i.e. [0, 0, 0, 0, 0, 0, 3, 0, 0, 0]. Considering all the three dimensions, the flow capacity of the individual nodes is the sum of the flow capacity at individual dimensions, i.e. [0, 0, 1, 4, 5, 6, 14, 6, 4, 4].

It would be apparent to a person skilled in the art how to calculate the flow capacity of the individual nodes with dimensions higher than 3 according to the above description.

According to the above calculations, the flow capacity of each individual node in the web graph of FIG. 1 is obtained, and presented in Table 1 below, which also contains the PR of the nodes obtained from the PR calculator available at http://www.webworkshop.net/pagerank_calculator.php.

TABLE 1

Flow capacity and PR of the nodes of the web graph in FIG. 1

| Node | PR | FC | "In" degree | "Out" degree |
|---|---|---|---|---|
| 1 | 0.30 | 0 | 0 | 3 |
| 2 | 0.39 | 0 | 1 | 3 |
| 3 | 0.50 | 1 | 2 | 3 |
| 4 | 0.64 | 4 | 3 | 3 |
| 5 | 0.60 | 5 | 2 | 2 |
| 6 | 0.74 | 6 | 2 | 1 |
| 7 | 1.51 | 14 | 4 | 1 |
| 8 | 1.73 | 6 | 2 | 1 |
| 9 | 1.77 | 4 | 1 | 1 |
| 10 | 1.81 | 4 | 1 | 0 |

(PR = PageRank, FC = flow capacity)

It can be realized that the PR of the nodes shows some awkward results in ranking the importance and relevance of the nodes. For example, node 10 has the highest PR, but there is only one incoming link from node 9. Same is true for nodes 8 and 9. On the other hand, the flow capacity scores calculated from method of this invention provide more sensible results. For instance, nodes 1 and 2 have a score of zero, since node 1 has no incoming link at all. Although node 2 has one incoming link from node 1, the incoming link has no contribution to node 2, as node 1 has the score of zero. Node 7 has the highest score of flow capacity, followed by the nodes 6 and 8.

It should be noted that the calculations involved in the method of this invention would be simpler than the method of PR, and no iterations are required.

If one wishes to compare the flow capacity from one web graph to another, that is, from one network to another, a more complex equation (2) can be used:

$$FC(W) = \frac{1}{n(n-1)} \sum_{i=1}^{n} \sum_{k=1}^{l} \sum_{j=1}^{n} \frac{k}{d_k(i,j)} \quad (2)$$

wherein the symbols in equation (2) have the same definitions as those in equation (1), while i represents the individual node in the network.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A method of ranking a node within a network of a plurality of interconnected nodes, each node having a connection with at least one other node in the network, the method including the steps of:
   constructing a representation matrix, in a computer processing device, wherein each element of the representation matrix represents the connection between each of the interconnected nodes;
   obtaining a flow matrix by multiplying the representation matrix by itself, in the computer processing device, wherein each element of the flow matrix represents a flow dimension of the respective node;
   calculating, in the computer processing device, flow capacity of each node based on the flow dimension, wherein the flow capacity of each node represents the number of connections to a particular node versus the distance or number of node interconnections required to access said particular node from all other nodes of the network; and
   ranking, in the computer processing device, each node according to its respective flow capacity.

2. The method of claim 1, wherein each element of the representation matrix uses the number "1" to represent the presence of a connection between each of the interconnecting nodes and the number "0" to represent the absence of a connection between each of the interconnecting nodes.

3. The method of claim 1, wherein the flow capacity of each node is calculated by equation 1:

$$FC(v_i) = \frac{1}{(n-1)} \sum_{k=1}^{l} \sum_{j=1}^{n} \frac{k}{d_k(i,j)} \quad (1)$$

wherein
   n is the total number of nodes in the network;
   i and j denotes particular node i and node j in the network;
   l is the highest number in the flow matrix;
   $d_k(i,j)$ is the shortest distance from node i to node j in a flow graph representing the flow matrix; and
   k is the dimension from 1 to l.

4. The method of claim 1, wherein the representation matrix is provided in upper triangular form.

5. The method of claim 1, wherein all of the elements in the lower diagonal portion of the flow matrix are set to zero such that the flow matrix is in upper diagonal form.

6. The method of claim 1, wherein the network is the internet, and each node is a web page.

7. An apparatus for ranking a node within a network of a plurality of interconnected nodes, each node having a connection to at least one other node in the network comprising:

means, including a computer processing device, for constructing a representation matrix, wherein each element of the representation matrix represents the connection between each of the interconnected nodes;

means for obtaining a flow matrix by multiplying the representation matrix by itself, in the computer processing device, wherein each element of the flow matrix represents a flow dimension of the respective node;

means for calculating, in the computer processing device, flow capacity of each node based on the flow dimension, wherein the flow capacity of each node represents the number of connections to a particular node versus distances or number of node interconnections required to access said particular node from all other nodes; and means for ranking, in the computer processing device, each node according to its respective flow capacity.

8. The apparatus of claim 7, wherein each element of the representation matrix uses the number "1" to represent the presence of a connection between each of the interconnecting nodes and the number "0" to represent the absence of a connection between each of the interconnecting nodes.

9. The apparatus of claim 7, wherein the flow capacity of each node is calculated by equation 1:

$$FC(v_i) = \frac{1}{(n-1)} \sum_{k=1}^{l} \sum_{j=1}^{n} \frac{k}{d_k(i, j)} \qquad (1)$$

wherein
n is the total number of nodes in the network;
i and j denotes particular node i and node j in the network;
l is the highest number in the flow matrix;
$d_k(i,j)$ is the shortest distance from node i to node j in a flow graph representing the flow matrix; and
k is the dimension from 1 to l.

10. The apparatus of claim 7, wherein the representation matrix is provided in upper triangular form.

11. The apparatus of claim 7, wherein all of the elements in the lower diagonal portion of the flow matrix are set to zero such that the flow matrix is in upper diagonal form.

12. The apparatus of claim 7, wherein the network is the internet, and each node is a web page.

* * * * *